Sept. 22, 1931.  C. C. FARMER  1,824,043
MAGNETIC BRAKE
Filed Feb. 27, 1928  2 Sheets-Sheet 1
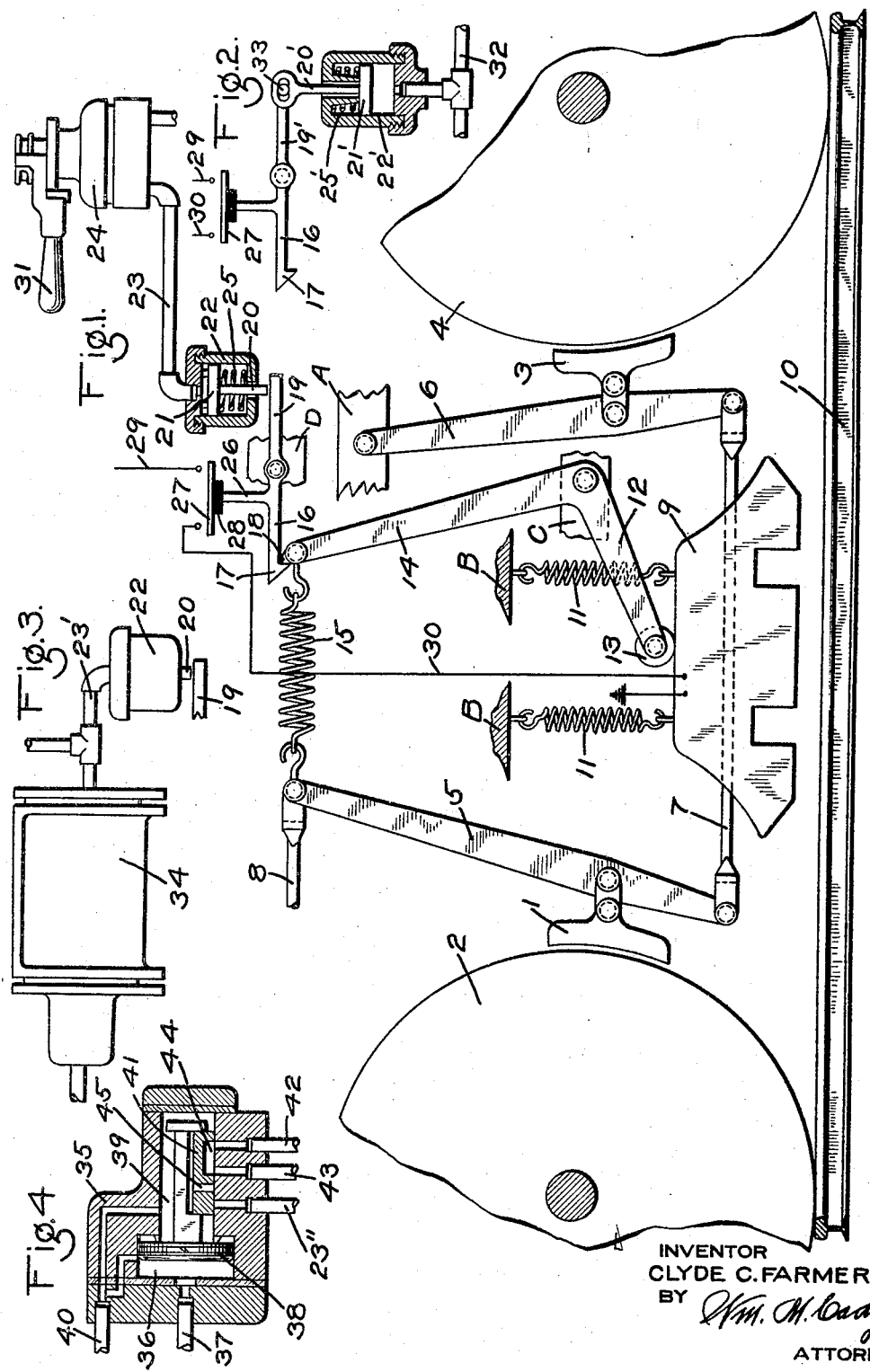
INVENTOR
CLYDE C. FARMER
BY Wm. M. Cady
ATTORNEY

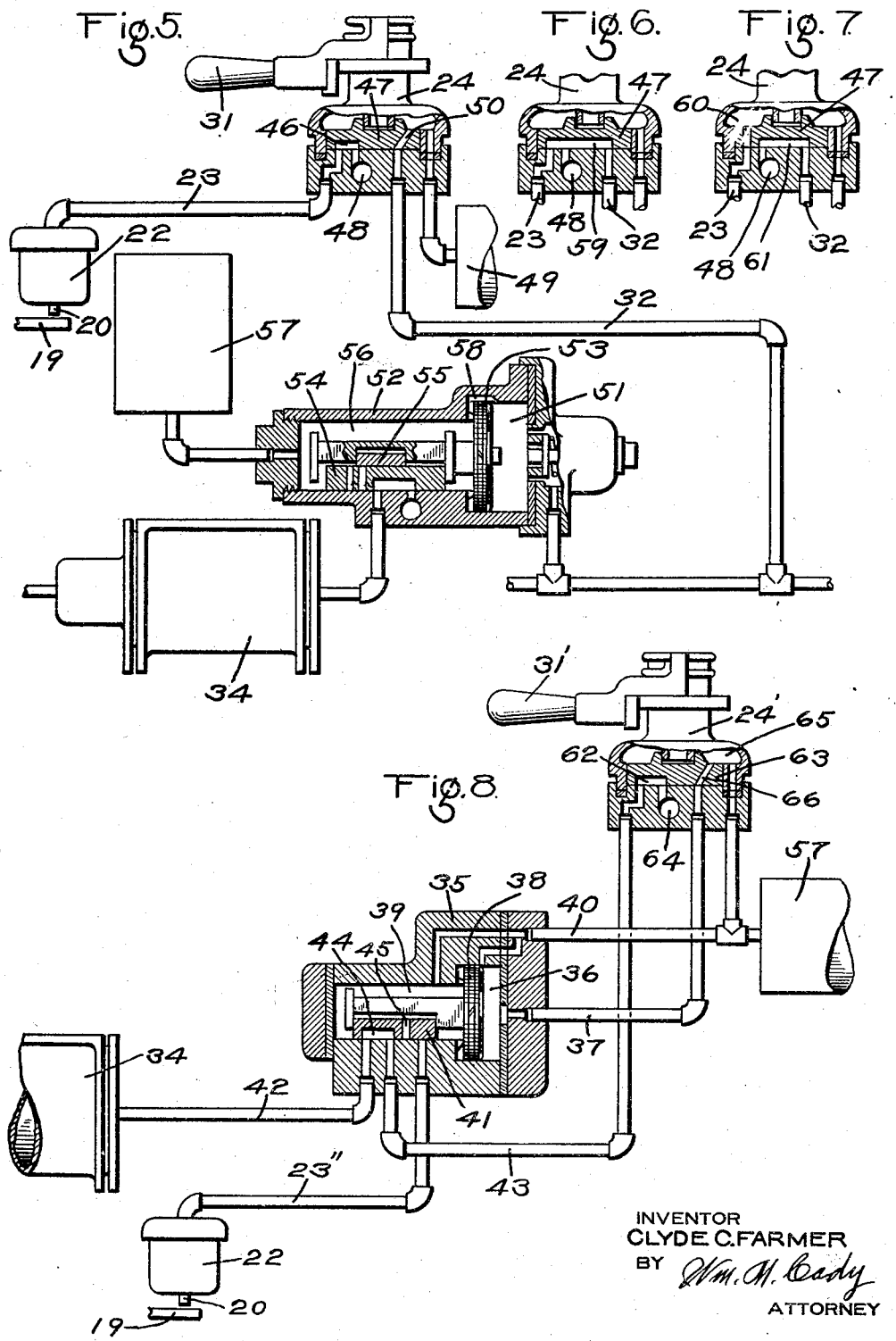

Patented Sept. 22, 1931

1,824,043

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAGNETIC BRAKE

Application filed February 27, 1928. Serial No. 257,164.

This invention relates to railway brakes, and has for its principal object to provide a magnetic brake as an auxiliary brake associated with a fluid pressure brake and operative upon effecting a pneumatic emergency application of the brakes.

In the accompanying drawings; Fig. 1 is a diagrammatic view of a brake equipment embodying my invention; Fig. 2 a view of a modified form of that feature of my invention which involves the operation of the magnetic brake upon effecting an emergency application of the brakes; Fig. 3 a view of a further modification of the feature referred to in connection with Fig. 2; Fig. 4 a sectional view of an emergency valve device modified to accomplish the purpose of my invention; Fig. 5 a diagrammatic view of an automatic fluid pressure brake employed with the construction shown in Fig. 1; Fig. 6 a sectional view of the brake valve shown in Fig. 5, with the rotary valve in service application position; Fig. 7 a sectional view of the brake valve shown in Fig. 5, with the rotary valve in emergency application position; and Fig. 8 a more detailed view of the brake equipment associated with the Fig. 4 construction.

The brake equipment shown in Fig. 1 comprises a brake shoe 1 adapted to engage one wheel 2 of a pair of wheels and connected by the usual brake beam to a similar brake shoe adapted to engage the other wheel and a brake shoe 3 adapted to engage a wheel 4 of a pair of wheels and connected by the usual brake beam to a similar brake shoe adapted to engage the other wheel of the pair of wheels.

The pair of brake shoes including the brake shoe 1 is operatively connected to a live lever 5 and the pair of brake shoes including the brake shoe 3 is operatively connected to a dead lever 6. The levers 5 and 6 are connected by a rod 7 and the outer end of lever 5 is connected to a pull rod 8, which is operatively connected to the usual fluid pressure brake cylinder (not shown), the outer end of lever 6 being fulcrumed on a fixed portion A of the car.

A magnetic brake shoe 9 is suspended above each rail 10 by springs 11, which are secured at one end to a fixed portion B of the car. Fulcrumed to a fixed portion C of the car is a lever having the end of one arm 12 provided with a roller 13 adapted to engage a surface of the brake shoe 9 and having the end of the other arm 14 connected by a coil spring 15 with the outer end of the live lever 5.

Fulcrumed on a fixed portion D of the car is a lever, one arm 16 of which is provided at its outer end with a latch 17 adapted to engage a projection 18 carried by the outer end of lever 14. The other arm 19 of the latch lever is adapted to be engaged by a stem 20 carried by a piston 21 which is mounted in a cylinder 22. The chamber at one side of the piston 21 is connected by a pipe 23 to an engineer's brake valve device 24 and the chamber at the opposite side of the piston contains a coil spring 25 which acts on piston 21. The lever arm 16 carries a stem 26 to which is secured a switch member 27, the stem 26 being insulated from the contact member 27 by a section 28 of insulating material.

When the switch member 27 is moved upwardly, it is adapted to connect a current supply wire 29 with a wire 30 connected to the energizing coils (not shown) of the magnetic brake shoe 9.

In operation, when the brakes are released, the parts are in the positions shown in Fig. 1, with the brake shoes 1 and 3 held away from the wheels and with the magnetic brake shoe 9 held suspended away from the rail 10. The latch 17 also engages the projection 18 of the lever arm 14.

The brake valve being in release position, a cavity 46 in the rotary valve 47 connects pipe 23 with an exhaust port 48, while fluid under pressure is supplied in the usual manner from the main reservoir 49 through port 50 to the brake pipe 32. The brake pipe 32 is connected to the piston chamber 51 of the usual triple valve device 52, and piston 53 moves the slide valves 54 and 55 to release position, in which the valve chamber 56 and the auxiliary reservoir 57 are charged from the brake pipe 32, through feed groove 58, in the usual manner.

When the usual fluid pressure brake apparatus is to be operated to effect a service application of the brakes, the brake valve handle 31 of the brake valve 24 is turned to service application position, as shown in Fig. 6, and fluid under pressure is supplied to the usual brake cylinder to cause the brake shoes 1 and 3 to be applied to the wheels 2 and 4 through the pull exerted on the pull rod 8, fluid under pressure being supplied to the brake cylinder either directly or automatically by operation of the triple valve device 52, when the brake pipe pressure is reduced.

In service application position of the brake valve device 24 as well as in release position, the pipe 23 is connected to the atmosphere, through cavity 59 in the brake valve device, so that spring 25 maintains piston 21 in the position shown in Fig. 1 and consequently, the latch 17 remains in engagement with the projection 18 of the lever arm 14 and therefore when the brake lever 5 moves to apply the brakes in a service application, the lever arm 14 is held against movement by the latch 17 and the magnetic brake shoe is held inoperative.

In the emergency position of the brake valve 24, a port 60 supplies fluid under pressure from the main reservoir 49 to the pipe 23, while fluid under pressure is vented from the brake pipe 32 through cavity 61 to effect an emergency application of the brakes.

Fluid under pressure thus supplied through pipe 23 to piston 21 operates said piston, so that stem 20 moves downwardly to depress the lever arm 19. The latch 17 is then tripped out of engagement with the projection 18 and consequently, when the brakes are pneumatically applied in effecting an emergency application of the brakes, the movement of the lever 5 operates through spring 15 to rotate the lever arm 14 toward the left. The arm 12 of the lever is consequently rotated, so that roller 13 acts to press the brake shoe downwardly into engagement with the rail 10. The movement of the lever arm 16 to trip the latch 17 also causes the contact member 27 to close the circuit from the current supply wire 29 to the wire 30, so that the coils of the magnetic brake shoe 9 are energized to magnetize the brake shoe and effect a braking action by the frictional engagement of the brake shoe with the rail.

When the brake valve handle 31 is moved to release position to effect the release of the brakes, fluid under pressure is vented from pipe 23, permitting piston 21 to be shifted upwardly by the spring 25. The lever arm 16 then moves to normal position, by gravity, so that the switch member 27 moves to open the magnetic brake circuit. When the brake shoe 9 is deenergized, the springs 11 move the brake shoe away from the rail and cause the lever arms 12 and 14 to assume their normal release position, as shown in the drawings. In the movement of the arm 14 back to normal position the latch 17 rides over the projection 18 and drops back to its locking position as shown.

Instead of operating the latch lever by fluid pressure supplied from the brake valve device as in the Fig. 1 construction, the latch lever may be operated upon a predetermined reduction in the brake pipe or emergency pipe, as shown in Fig. 2.

In this case, the brake pipe or emergency pipe 32 is connected to the chamber at one side of the piston 21', the pipe being normally charged with fluid under pressure. The spring 25' acts on the piston 21' in opposition to the fluid pressure and stem 20' is provided with an end portion having an elongated slot for receiving a pin 33 carried by the lever arm 19'.

With this form of the invention, when the pressure in the pipe 32 is reduced to a degree for effecting an emergency application of the brakes, the spring 25' acts to move piston 21' downwardly, causing the stem 20' to operate the pin 33, so that the lever arm 19' is moved downwardly and thereby the latch 17 is tripped from engagement with the projection 18, while the contact member 27 is moved to close the circuit of the energizing coils of the magnetic brake shoe 9, the operation being substantially the same as that of the construction shown in Fig. 1.

According to the construction shown in Fig. 3, the fluid pressure for operating the piston 21 is supplied directly from the brake cylinder 34. When the pressure in the brake cylinder has been increased to a predetermined degree, as when an emergency application of the brakes is effected, the fluid pressure supplied to piston 21 is sufficient to overcome the pressure of spring 25, so that the latch lever is then operated in the same manner as in the case of the construction shown in Fig. 1.

In Fig. 4 is shown an emergency valve device comprising a casing 35 having a piston chamber 36 connected to an emergency brake pipe 37 and containing a piston 38 and having a valve chamber 39 connected to a main reservoir supply pipe 40 and containing a slide valve 41 adapted to be operated by piston 38.

As shown in Fig. 8, pipe 23" leads to the seat of slide valve 41 and said pipe is connected to the cylinder 22 of the latch controlling device. Pipe 42 leads from the usual brake cylinder 34 to the seat of the slide valve 41 and in the normal release position of the emergency valve device, a cavity 44 in slide valve 41 connects pipe 42 with a straight air pipe 43 for permitting the brakes to be operated by straight air to effect a service application of the brakes.

In the release position of the usual brake valve device 24' as shown in Fig. 8, straight air pipe 43 is connected through cavity 62 in the usual rotary valve 63 with exhaust port 64, while the emergency pipe 37 is supplied from rotary valve chamber 65, through port 66 with fluid under pressure from the main reservoir 57.

When the pressure in pipe 37 is reduced to effect an emergency application of the brakes by moving the brake valve handle 31' to emergency application position, the piston 38 is shifted to its outer emergency position, in which fluid at main reservoir pressure is supplied from valve chamber 39 to the brake cylinder 34 through pipe 42. In emergency position of slide valve 41, a port 45 registers with pipe 23", so that fluid under pressure is supplied through pipe 23" to the piston 21, causing the latch lever to be operated in the same manner as in the case of the construction shown in Fig. 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a fluid pressure brake and a magnetic brake shoe normally held suspended above the rail, of mechanism operated upon applying the fluid pressure brake for shifting the magnetic brake shoe to engagement with the rail, means for locking said mechanism against operation, and means operated upon applying the brakes for releasing said locking means to permit said mechanism to operate.

2. The combination with a fluid pressure brake and a magnetic brake shoe normally held suspended above the rail, of mechanism operated upon applying the fluid pressure brake for shifting the magnetic brake shoe to engagement with the rail, means for locking said mechanism against operation, a brake valve device for controlling the operation of said fluid pressure brake and having a service and an emergency application position, and means operative upon movement of said brake valve device to its emergency application position for releasing said locking means.

3. The combination with a fluid pressure brake and a magnetic brake shoe normally held suspended above the rail, of mechanism operated upon applying the fluid pressure brake for shifting the magnetic brake shoe to engagement with the rail, means for locking said mechanism against operation, a brake valve device for controlling the operation of said fluid pressure brake and having a service and an emergency application position, and means operated only upon movement of said brake valve device to emergency position for releasing said locking means.

4. The combination with a magnetic brake shoe normally held suspended above the rail and a wheel brake including a brake lever, of a lever device operatively connected to said brake lever and operated upon movement of the brake lever to shift said brake shoe to engagement with the rail, a latch engaging said lever device for preventing movement thereof, a piston device operated by fluid under pressure for shifting said latch to release said lever device, and means operated upon applying the brakes for supplying fluid under pressure to said piston.

5. The combination with a magnetic brake shoe normally held suspended above the rail and a wheel brake including a brake lever, of a lever device operatively connected to said brake lever and operated upon movement of the brake lever to shift said brake shoe to engagement with the rail, a latch engaging said lever device for preventing movement thereof, a piston device operated by fluid under pressure for shifting said latch to release said lever device, and a brake valve device for controlling the brakes and having a brake applying position in which fliud under pressure is supplied to said piston.

6. The combination with a magnetic rail brake shoe and a fluid pressure wheel brake operable to effect either a service or an emergency application of the brakes, of mechanism for shifting said brake shoe to engage the rail, means for locking said mechanism against operation and for controlling the circuit through which current is supplied to said brake shoe, and means operated upon effecting an emergency application of the brakes for effecting the operation of said locking means to permit said mechanism to operate and for closing said circuit to effect the energization of said brake shoe.

In testimony whereof I have hereunto set my hand.

CLYDE C. FARMER.